Patented June 25, 1940

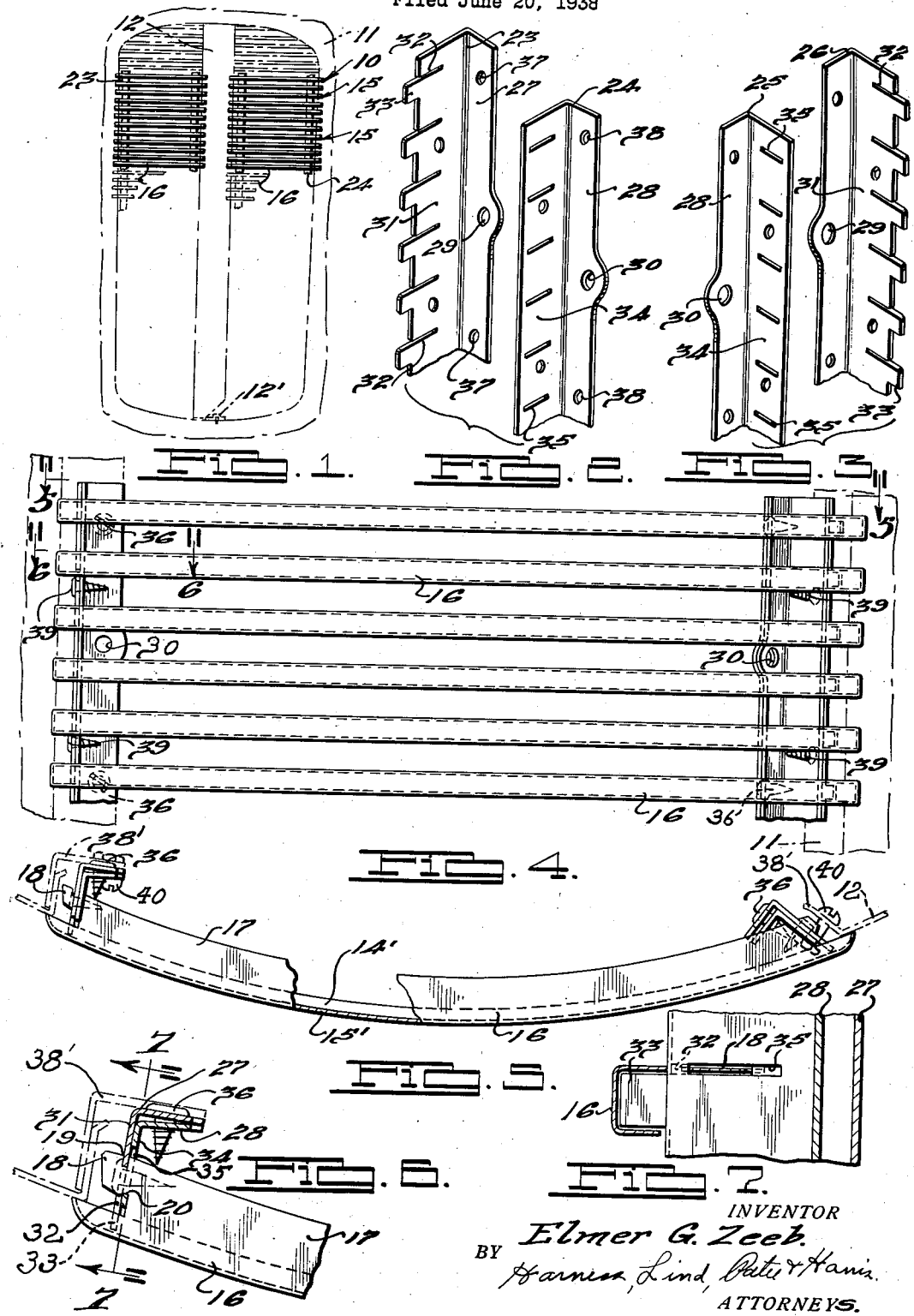

2,205,453

UNITED STATES PATENT OFFICE 2,205,453

RADIATOR GRILLE

Elmer G. Zeeb, Detroit, Mich., assignor to Chrysler Corporation, Highland Park, Mich., a corporation of Delaware Application June 20, 1938, Serial No. 214,661

11 Claims. (Cl. 293—54)

This invention relates to grille-like structures of an ornamental type such as are employed on vehicles and refers more particularly to improvements in grille structures adapted to provide a front facing for motor vehicle radiators.

Heretofore the component members of grilles of this kind have been permanently connected together, cast in one piece, or otherwise incapable of convenient removal and replacement. Radiator grilles are often subjected to damage which frequently results in the deforming or breaking of only a few of the component members thereof, but, nevertheless, the entire grille must be replaced at great cost and inconvenience.

One of the main objects of the invention is to eliminate these objections by providing a grille-like structure having component members which may be conveniently removed and replaced without necessitating the scrapping of the entire grille.

Further objects of the invention are to provide a grille of this character which has its component members secured together in an improved manner; and to provide a grille of this kind which has improved structural properties which may be produced at a low manufacturing cost, and which is simple to manufacture and assemble.

An additional object of the invention is the provision of improved means for detachably securing a plurality of rib-like structures together and which are substantially completely obscured from view.

Other objects and advantages of the invention will be more apparent from the following description taken in connection with the accompanying drawing, in which:

Fig. 1 is a fragmentary, front elevational view of a grille embodying the invention showing portions of a pair of grille sections thereof.

Fig. 2 is a detail, perspective view of a pair of fastening plates which constitutes a left, vertical side bar of each of the grille sections shown in Fig. 1.

Fig. 3 is a detail, perspective view of a pair of fastening plates which constitutes a right, vertical side bar of each of the grille sections shown in Fig. 1.

Fig. 4 is an enlarged, fragmentary, elevational view of a portion of one of the grille sections shown in Fig. 1.

Fig. 5 is a horizontal, sectional view taken along the line 5—5 of Fig. 4.

Fig. 6 is an enlarged, vertical, sectional view taken approximately as indicated by the line 6—6 of Fig. 4.

Fig. 7 is an enlarged, vertical, sectional view taken as indicated by the line 7—7 of Fig. 6.

In the form of the invention illustrated in the drawing, the improved grille, generally designated by the numeral 10, extends across the open face of a motor vehicle radiator shell 11 and includes a flanged strip-like central portion 12 which is disposed substantially vertically across the open face of the radiator shell. The central portion 12 may be formed as an integral part of the radiator shell structure but it is preferably replaceably secured at its ends to the top and bottom extremities of the radiator shell 11 as indicated at 12'. The grille 10 also includes a pair of grille sections 15, one of which is disposed between the central portion 12 of the grille and each of the opposite side walls of the shell 11.

Each grill section 15 comprises a plurality of vertically spaced substantially horizontally extending sheet metal ribs 16 of substantially J-shape cross-section, each having a rearwardly extending substantially horizontal flange 17, a generally vertically disposed web part 15' and a rearwardly extending flange 14' substantially parallel to but of less width than the flange 17. The ribs 16 are arranged with their longer flanges 17 located above the narrow flanges 14' and with the closed sides of the channels formed by the web 15' and flanges 17 and 14' facing forwardly. These ribs are preferably longitudinally bowed or otherwise formed to bring the front of the radiator bearing portion of a vehicle to a desired contour and they are preferably plated, coated or otherwise finished to enhance the appearance of the front end of the vehicle. The respective grille sections are so constructed and arranged as to be independently mounted on the radiator shell 11 to form a complete grille and each section may, if desired, be made up of separate sub-sections attached together or independently mounted on the radiator shell.

The flanges 17 of the ribs 16 are provided with latching end portions which are located inwardly of the extremities of the channel portions of the bars and comprise a tongue 18. Each tongue 18 is located at the rear of the flange 17 and its opposite edge portions are provided with misaligned notches 19 and 20, as illustrated in Fig. 6.

The left ends of the ribs 16 of each grille section are held in vertically spaced relation by cleat-like members, each comprising a pair of angle bars 23 and 24 and the right ends of the ribs 16 of each grille section are held in spaced relation by a pair of angle bars 25 and 26, the bars 24 and 25 being identical and the bars 23 and 26 being similar but corresponding as right and left hand structures. The bars 23 and 24, shown in Fig. 2, are provided with flanges 27 and 28 having registering apertures 29 and 30 therein, respectively, and the angle bar 23 is adapted to fit with the angle bar 24 in the manner illustrated in Fig. 6 with the flanges 27 and 28 thereof in adjacent relationship. The outer bar 23 has a flange 31 in which are formed spaced transversely extending open end slots 32 for receiving the flange portions 17 of the ribs 16 as illustrated in Fig. 6. Provided on the edge portions of the flange 31 are a plurality of projections 33, one of which is located adjacent each slot 32. These projections are adapted to extend into and bear against the inner sides of the webs 15' of the ribs 16 when the flanges 17 thereof are disposed in the slots 32 of the bar 23. The inner bar 24 has a flange 34 in which are formed slots 35 which register with the slots 32 and which have opposite closed longitudinal extremities. The construction of the bars 25 and 26, shown in Fig. 3, corresponds with the construction of the bars 23 and 24 and the same numerals are used to designate corresponding portions thereof.

In assembling the ribs 16 in spaced relationship on the bars 23 and 24 of the left grille section, for example, the tongue 18 of each bar is initially inserted through the closed end slots of the flange 34 of the inner angle bar 24, with the flange 28 of the latter disposed inwardly. Then the outer angle bar 23 is disposed in superimposed relation on the inner angle bar with the tongues 18 extending through the slots 32 of the latter. This arrangement of the angle bars brings the flange 27 into adjacency with the outer side of the flange 28. When the bars 23 and 24 are so arranged, sheet metal securing screws 36 are inserted through apertures 37 in the flange 27 of the bar 23 and threaded in apertures 38 of the flange 28 of the bar 24. When these screws are tightened they tend to pull the flanges 27 and 28 together, thus urging the inner bar 24 upwardly, as viewed in Fig. 6, and engaging the extremity of the slots 35 remote from the flange 28 into the notches 20 of the tongues 18. The tightening action of the screws 36 forces the outer angle bar 23 downwardly, as viewed in Fig. 6, thus urging the closed extremity of the open end slot 32 of the flange 31 into the notch 19 of the tongue 18 and pressing the projections 33 of the flanges 31 into the channels of the ribs 16 and against the webs 15' thereof. The slots 32 and 35 of the respective angle bars are preferably so constructed and arranged that they do not accommodate pulling of the flanges 27 and 28 into contacting relationship and as a result the clamping actions of the screws 36 are applied directly on the tongues 18 of the ribs 16. The flanges 31 and 34 may be clamped together by screws 39. The angle bars 25 and 26 of the right side of the grille section structure are employed in the manner set forth above to secure the opposite ends of the ribs 16 in spaced relation.

When the grille sections have been assembled as described, they may be installed in the radiator shell by attaching the superimposed flanges 27 to 28 to corresponding flanges 38 of the shell structure and central bar portion 12 by screws 40 as illustrated in Fig. 5.

Grilles and other ornamental devices having a plurality of rib-like members, made in accordance with the invention, are economical to manufacture and assemble and they can be conveniently repaired by replacement of the detachable rib elements without scrapping the entire grille in the event of injury. The securing means for detachably fixing the ribs in spaced relation firmly hold them against displacement in all directions without deforming or otherwise producing an unsightly effect on the ribs. These securing means are well concealed from view and so constructed as not to require unsightly special construction of the radiator shell for their accommodation. The polished or otherwise finished ribs may be substantially completed before assembly and they may be individually conveniently worked upon.

Although but one specific embodiment of the invention is herein shown and described, it will be understood that various changes in the size, shape and arrangement of parts may be made without departing from the spirit of the invention.

What is claimed is:

1. A grille-like structure comprising a plurality of spaced ribs each having outwardly extending projections on their opposite end portions, a pair of interfitting angle bars adjacent the opposite ends of said ribs each extending transversely thereof and having registering slots for receiving said projections of said ribs, and means for securing the angle bars of each pair thereof together and for urging one closed end of the slot in each bar respectively against opposite edge portions of said projections.

2. A grille-like structure comprising a plurality of spaced ribs, each having an outwardly extending projection on a corresponding end portion thereof, each of said projections having notches in opposite edge portions thereof, a cleat-like member for fixing said corresponding ends of said ribs together, said member comprising a pair of adjacent plates having registerable slots therein for receiving said projections, each slot having an extremity engageable in one of the notches of said projection respectively, and means securing said plates together and urging the same in respectively opposite directions for maintaining said extremities of said slots interlocked in said notches.

3. A grille-like structure comprising a plurality of spaced ribs, each having an outwardly extending projection on a corresponding end portion thereof, each of said projections having notches in opposite edge portions thereof, a cleat-like member for fixing said corresponding ends of said ribs together, said member comprising a pair of interfitting angle bars having registerable slots in one pair of corresponding flanges thereof for receiving said projections, each slot having an extremity engageable in one of the notches of said projections respectively, and means acting upon the other pair of corresponding flanges of said angle bars for urging the latter together and for holding said extremities of said slots in the respective notches of said projections under pressure.

4. In a radiator shell assembly; a grille-like structure comprising a plurality of spaced ribs, each having an outwardly extending projection on a corresponding end portion thereof, each of said projections having notches in opposite edge portions thereof, transversely extending cleat-like means for fixing said corresponding ends of said ribs together, said means comprising a pair of interfitting angle bars having registerable slots in one pair of corresponding flanges thereof for receiving said projections, each slot having an extremity engageable in one of the notches of said projections respectively, means acting upon the other pair of corresponding flanges of said angle bars for urging the latter together and for holding said extremities of said slots in the respective notches of said projections under pressure, and means engaging said latter pair of corresponding flanges for detachably securing said grille-like structure on said radiator shell.

5. A grille-like structure comprising a plurality of spaced ribs, each including a channel shaped edge portion having a front web and a rearwardly extending flange, a tongue on corresponding end portions of the flanges of said ribs, each having notches in their opposite edge portions, a cleat-like member extending transversely of said ribs for fixing corresponding end portions of said flanges together, said member comprising a pair of plate-like elements each having registerable apertures therein provided with a closed extremity, the closed extremity of the slots of one of said elements being engageable in the notches of one edge of said tongue and the closed extremities of the slots of the other element being engageable in the notches of the opposite edges of said tongues, and means for securing said plates together and urging the same in opposite directions so as to clampingly engage said tongue edgewise in said notches.

6. A grille-like structure comprising a plurality of spaced ribs, each including a channel shaped edge portion having a front web and a rearwardly extending flange, a tongue on corresponding end portions of the flanges of said ribs, each having notches in their opposite edge portions, a cleat-like member extending transversely of said ribs for fixing corresponding end portions of said flanges together, said member comprising a pair of plate-like elements each having registerable apertures therein provided with a closed extremity, the closed extremity of the slots of one of said elements being engageable in the notches of one edge of said tongues and the closed extremities of the slots of the other element being engageable in the notches of the opposite edges of said tongues, and means for securing said plates together and urging the same in opposite directions so as to clampingly engage said tongue edgewise in said notches, one of said plate-like elements having a projection associated with each slot thereof and receivable in the channel of one of said ribs, respectively, said projections being urged into said channels by said means.

7. A grille-like structure comprising a plurality of spaced ribs, each including a channel shaped edge portion having a front web and a rearwardly extending flange, a tongue on corresponding end portions of the flanges of said ribs, each having notches in their opposite edge portions, a cleat-like member extending transversely of said ribs for fixing corresponding end portions of said flanges together, said member comprising a pair of interfitting angle bars having registerable slots in one pair of corresponding flanges thereof for receiving said projections, each slot having an extremity engageable in one of the notches of said projections respectively, and means acting upon the other pair of corresponding flanges of said angle bars for urging the latter together and for holding said extremities of said slots in the respective notches of said projections under pressure, one of said flanges of said angle bars having a lug associated with each slot thereof and receivable in the channel of one of said ribs respectively, said lug being urged into said channel by said means.

8. In a motor vehicle grille, a plurality of laterally spaced transversely extending bars each of which has a pair of oppositely extending notches at each end, two pairs of laterally spaced fastening members extending transversely of said bars, each pair of said members having spaced slots latchingly engaged with the adjacent notched ends of said bars respectively for detachably retaining the latter in laterally spaced relation.

9. In a grille, a plurality of laterally spaced bars, support means for said bars including a pair of relatively movable adjacently disposed members having registering notches therein receiving said bars respectively and extending transversely thereto, and means for detachably securing said members together, said securing means urging said members one relative to the other for causing wall portions of said notches to engage said bars.

10. In a grille, a plurality of laterally spaced bars, support means for said bars including a pair of adjacently disposed members extending transversely of said bars, said members having registering slots therein receiving said bars respectively with a lost motion clearance therebetween, and securing means detachably engaging said members and urging one relative the other for taking up said lost motion clearance.

11. In a grille, a plurality of laterally spaced bars, a pair of interfitting angle members having adjacent portions disposed in spaced relationship, said members having registering notches therein for receiving said bars, respectively, and means engaging said members for detachably securing the latter together, said securing means urging said members one toward the other whereby wall portions of said notches firmly engage the bar therein.

ELMER G. ZEEB.